United States Patent [19]

Sato et al.

[11] Patent Number: 5,151,586
[45] Date of Patent: Sep. 29, 1992

[54] SCANNING EXPOSURE DEVICE PROVIDED WITH INTENSITY CORRECTION TO COMPENSATE FOR SCAN ANGLE

[75] Inventors: Shougo Sato, Nagoya; Tsuyoshi Ohashi, Hashima; Shinichi Hirahata, Kagamigahara, all of Japan

[73] Assignee: Brother Kogyo Kabushiki Kaisha, Nagoya, Japan

[21] Appl. No.: 733,614

[22] Filed: Jul. 22, 1991

[30] Foreign Application Priority Data

| Aug. 1, 1990 | [JP] | Japan | 2-204250 |
| Aug. 27, 1990 | [JP] | Japan | 2-224614 |
| Aug. 27, 1990 | [JP] | Japan | 2-224615 |

[51] Int. Cl.⁵ .............................. G01J 1/26
[52] U.S. Cl. ............................ 250/205; 346/108; 358/481
[58] Field of Search ............. 358/481, 474, 296, 206; 250/205, 236, 235, 237 R; 346/108, 160; 350/6.7, 6.8

[56] References Cited

U.S. PATENT DOCUMENTS

| 3,582,659 | 6/1971 | Dekker | 356/319 |
| 4,201,994 | 5/1980 | Hoshito et al. | 346/108 |
| 4,400,740 | 8/1983 | Traino et al. | 358/481 |
| 4,443,695 | 4/1984 | Kitamura | 250/205 |
| 4,695,714 | 9/1987 | Kimizuka et al. | 250/205 |
| 4,831,247 | 5/1989 | Ishizaka | 250/205 |
| 4,847,492 | 7/1989 | Houki | 250/235 |
| 4,894,524 | 1/1990 | Murase et al. | 250/205 |
| 4,905,037 | 2/1990 | Yamamoto | 355/27 |
| 4,926,263 | 5/1990 | Yokota | 358/474 |
| 4,959,664 | 9/1990 | Naiki et al. | 346/108 |

Primary Examiner—Janice A. Howell
Assistant Examiner—James Beyer
Attorney, Agent, or Firm—Oliff & Berridge

[57] ABSTRACT

A scanning exposure device comprises a laser light source which emits a laser beam and a polygonal rotating mirror which reflects a laser beam emitted by the laser light source. The scanning exposure device scans the laser beam reflected by the polygonal rotating mirror on a surface of a photoconductive drum for exposure. The scanning exposure device is provided with an intensity correcting unit for correcting the intensity of the laser beam so that the intensity of the laser beam on the surface of the photoconductive drum does not vary regardless of variation of the incident angle of the laser beam falling on the polygonal rotating mirror as the polygonal rotating mirror rotates.

19 Claims, 7 Drawing Sheets

| A | f(X) |
|---|---|
| 1 | f(1) |
| 2 | f(2) |
| . | . |
| . | . |
| . | . |
| 2376 | f(2376) |

Fig.3B

| A | Data |
|---|---|
| 1 | $B_1$ |
| 2 | $B_2$ |
| . | . |
| . | . |
| . | . |
| 2376 | B2376 |

SCANNING EXPOSURE DEVICE PROVIDED WITH INTENSITY CORRECTION TO COMPENSATE FOR SCAN ANGLE

BACKGROUND OF THE INVENTION

1. Field of the Invention

The present invention relates to a scanning exposure device and, more particularly, to a scanning exposure device provided with a moving mirror which deflects a laser beam falling thereon.

2. Description of Related Art

A scanning exposure device is provided with a moving mirror that deflects a laser beam emitted by a laser light source for scanning the laser beam on a photoconductive drum. Such a scanning exposure device is, for example, disclosed in U.S. Pat. No. 4,847,492 and U.S. Pat. No. 4,926,263 and the scanning exposure device is usually applied to printers and copying machines. A rotating polygon mirror is used in the scanning exposure device as the moving mirror which deflects the laser beam falling thereon. The scanning exposure device includes a scanning exposure control unit for controlling the laser light source to modulate the laser beam.

When the scanning exposure device is applied to formation of a latent image corresponding to a white image on the photoconductive drum, the scanning exposure control unit controls the laser light source so that the intensity of the laser beam is fixed. When the scanning exposure device is applied to formation of a latent image corresponding to a black image on the photoconductive drum, the scanning exposure control unit controls the laser light source so that the laser beam does not fall on the photoconductive drum. In forming a latent image corresponding to a gradated image on the photoconductive drum, the scanning exposure control unit controls the laser light source so that the intensity of the laser beam emitted by the laser light source is determined in order to obtain desired intensity of the laser beam on the photoconductive drum.

However, such a manner of controlling the intensity of the laser beam emitted by the laser light source causes incorrect exposure on the photoconductive drum when a variation in reflectance of the mirror occurs. The reason is that variation in reflectance of the moving mirror affects the intensity of the laser beam reflected by the moving mirror.

The reflectance of the moving mirror varies with the angle of incidence of the laser beam on the moving mirror. The angle of incidence of the laser beam on the moving mirror varies with the angular position of the moving mirror during rotation.

Figure 8:
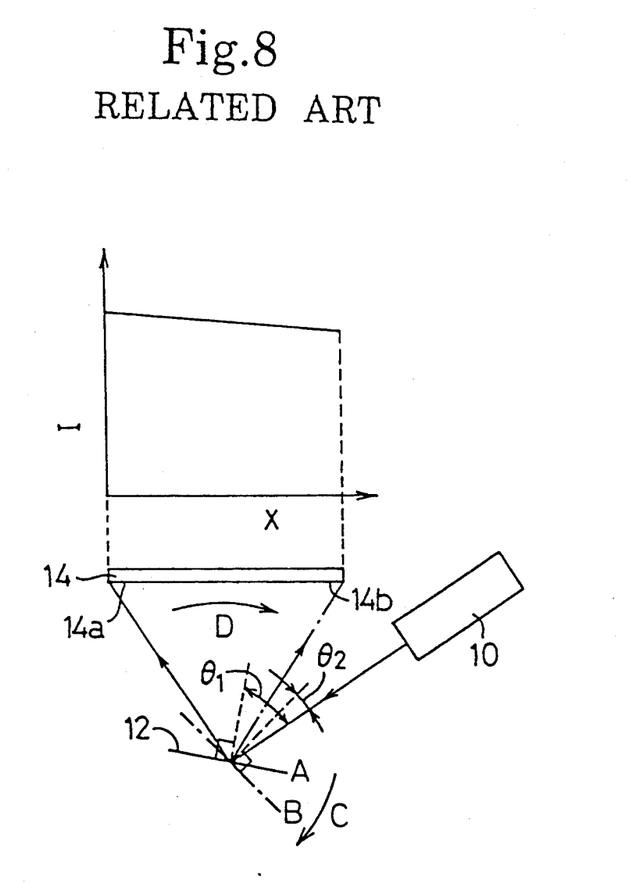
FIG. 8 is a diagram showing how the variation in intensity of the light reflected by a mirror varies according to the angular position of the mirror using a conventional scanning exposure device.

The variation in the intensity of the reflected laser beam is dependent on the angular position of the moving mirror as will be explained in more detail with reference to FIG. 8. A laser beam emitted by a laser light source 10 falls on a mirror 12. As the mirror 12 is turned in the direction of an arrow C from an angular position A, indicated by a continuous line, to an angular position B, indicated by an alternate long and short dash line, the laser beam is deflected by the mirror 12 as indicated by an arrow D to sweep the surface of a charged photoconductive drum 14 for scanning exposure from the left end 14a to the right end 14b. As the mirror 12 is turned from the angular position A to the angular position B, the angle of incidence of the laser beam decreases from an angle $\theta1$ to an angle $\theta2$, and the reflectance of the mirror 12 decreases accordingly.

Consequently, the intensity I of the reflected laser beam falling on the photoconductive drum 14 decreases as the spot of the laser beam moves from the left end position 14a to the right end position 14b even if the laser light source 10 emits a laser beam of a fixed intensity and, consequently, the local charge of the photoconductive drum 14 is greater for positions nearer to the right end position 14b, as the discharge is reduced as a result of the reduced reflected light, and hence the density of the printed image varies accordingly.

The incorrect exposure is not a very significant problem in forming a gradated image in the low gradations used by conventional printers or copying machines. However, in forming a gradated image on a recording sheet, for example, having a fine gradation of 256 steps of density (division of densities between white and black into 256 levels of density), the intensity of the laser beam must be controlled in 256 intensity levels. Therefore, the variation of the intensity of the reflected laser beam due to the variation of the angular position of the moving mirror affects the gradation of the recorded image significantly.

SUMMARY OF THE INVENTION

It is an object of the present invention to overcome the above described drawbacks and disadvantages and to provide a scanning exposure device for scanning a laser beam on a photoconductive means for exposure that is capable of preventing the influence of the variation in the reflectance of a mirror on the intensity of the laser beam reflected by the mirror.

It is another object of the present invention to provide a scanning exposure device capable of correcting the variation in the intensity of laser beam reflected by a moving mirror due to variation in the angle of incidence of the laser beam on the mirror so that photoconductive means can be scanned by the laser beam with a desired intensity.

To attain these and other objects, the present invention provides a scanning exposure device comprising: a laser means for emitting a laser beam with a predetermined intensity; a mirror for reflecting the laser beam emitted by the laser means; photoconductive means for receiving the laser beam reflected by the mirror; scanning exposure means for scanning the laser beam on the photoconductive means in accordance with the variation in angular position of the mirror to deflect the laser beam; and correcting means for correcting the predetermined intensity of the laser beam so that an intensity of the laser beam on the photoconductive means does not vary regardless of a variation in a reflectance of the mirror.

According to the present invention, the correcting means corrects the intensity of the laser beam so that the intensity of the reflected laser beam does not vary regardless of the variation in the reflectance of the mirror. Thus, the photoconductive means is scanned by the reflected laser beam of desired intensity for desired exposure regardless of the variation of the reflectance of the mirror.

BRIEF DESCRIPTION OF THE DRAWINGS

The foregoing and other objects, features and advantages of the present invention will become more apparent by reading the following detailed description of the preferred embodiments of the invention, when considered in connection with the accompanying drawings, in which.

DETAILED DESCRIPTION OF THE PREFERRED EMBODIMENTS

Figure 1:
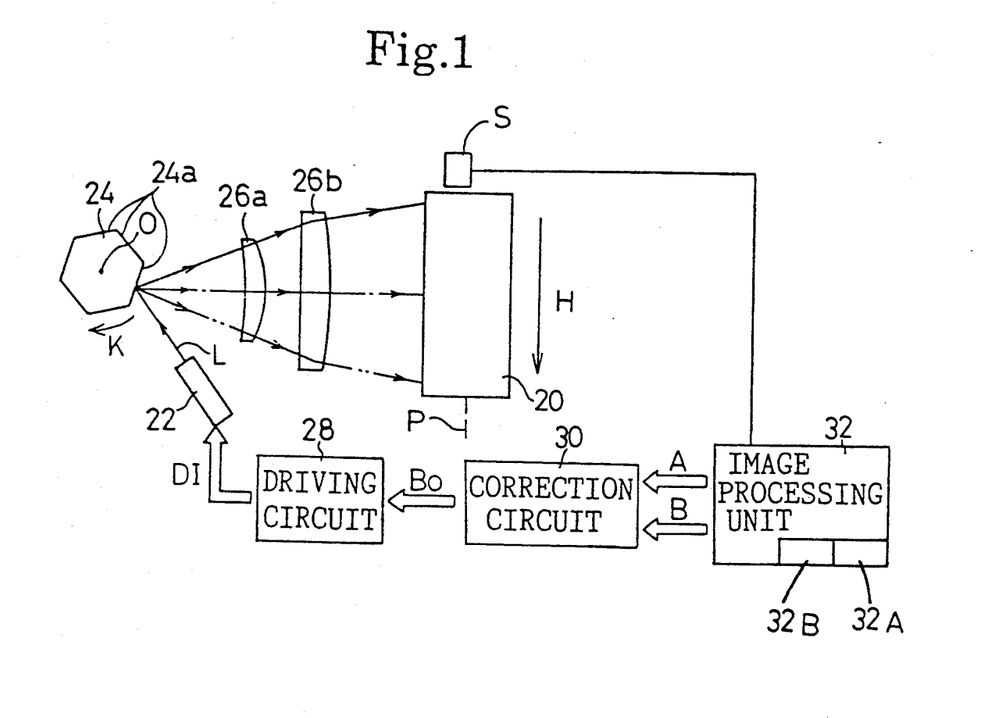
FIG. 1 is a diagrammatic view of a first embodiment of a scanning exposure device of the invention.

FIG. 1 shows a first embodiment of a scanning exposure device of the invention incorporated into an electrophotographic apparatus which forms a latent image on the surface of a charged photoconductive drum by scanning the charged surface of the photoconductive drum by a laser beam to partially remove the charge.

Referring to FIG. 1 a laser light source 22, which functions as the laser means, emits a laser beam L modulated according to a driving signal DI. The laser light source 22 comprises a semiconductor laser capable of varying the intensity of the laser beam L. The laser beam L is projected on a polygonal rotating mirror 24 formed by attaching mirrors 24a, such as polished aluminum plates, to the facets of a polygonal prism. The polygonal rotating mirror 24 is driven for rotation about its axis O in the direction of an arrow K at a fixed rotating speed. The center of the polygonal rotating mirror 24 is attached to an axis of a motor (not shown in FIG. 1) for the polygonal rotating mirror 24 which functions as a scanning exposure means.

The laser beam L falling on the polygonal rotating mirror 24 is reflected by each mirror 24a and is deflected as indicated by a continuous line, an alternate long and short dash line and an alternate long and two short dashes line according to the rotation of the polygonal rotating mirror 24, i.e., the variation of the angular position of each mirror 24a. The angle of incidence of the laser beam on each mirror 24a corresponds to the angular position of each mirror 24a. When the polygonal rotating mirror 24 is rotated, the laser beam L is deflected due to the variation of the angle of incidence of the laser beam on the polygonal rotating mirror 24. The deflected laser beam L travels through a set of fθ lenses 26a and 26b and falls in a spot on the surface of the photoconductive drum 20 which functions as a photoconductive means. The falling spot of the laser beam L is scanned across the surface of the photoconductive drum 20 in the direction of an arrow H (in a vertical direction as viewed in FIG. 1) for exposure as the polygonal rotating mirror 24 rotates. The polygonal rotating mirror 24, as shown in FIG. 1, has the shape of a hexagonal prism and hence six scanning exposure cycles are performed in one full turn of the polygonal rotating mirror 24. The cylindrical photoconductive drum 20 is rotated about its axis P in synchronization with the rotation of the rotating mirror 24.

The laser light source 22 is electrically connected to a driving circuit 28, for driving the laser light source 22, which functions as a driving means. The intensity of the laser beam L emitted by the laser light source 22 is controlled on the basis of the driving signal DI provided by the driving circuit 28. A correction circuit 30, which functions as a correction means, gives exposure data Bo to the driving circuit 28.

An image processing unit 32 is electrically connected to the correction circuit 30 in order to give exposure position data A and exposure intensity data B to the correction circuit 30. The exposure intensity data B is corrected by the correction circuit 30 in order to provide corrected exposure data Bo to the driving circuit 28.

The exposure position data A represents exposure positions X on the scanning line measured in the scanning direction of the laser beam L indicated by the arrow H. If an image is formed on a recording sheet of size A3 having a width of 297 mm in a picture element density of eight picture elements per 1 mm, each line has 2376 exposure positions for 2376 picture elements. Therefore, the exposure positions X are represented respectively by the exposure position data A indicating exposure positions No. 1 to No. 2376.

Figure 3A:
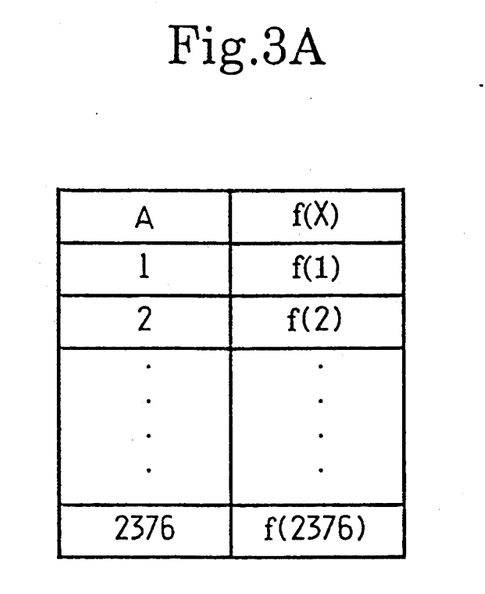
FIG. 3A is a table to be used by the correction circuit of the scanning exposure device of the first embodiment.
Figure 3B:
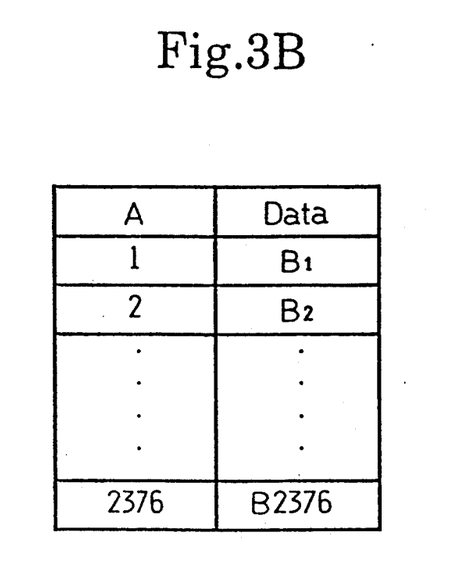
FIG. 3B is a table to be stored in a storage device of the first embodiment.

When an image is to be formed in a gradation of 256 density levels (grading the density varying between white and black in 256 steps), the exposure intensity data B indicates one of 256 intensity levels. As shown in FIG. 3B, the exposure position data A and the exposure intensity data B are related to each other to assign a picture element of one of 256 density levels to the corresponding position.

The image processing unit 32 comprises a storage device 32A, such as a RAM or a floppy disk, which stores image data including exposure position data A representing exposure positions on an image, and the corresponding exposure intensity data B. The storage device 32A is capable of storing at least an amount of image data corresponding to an entire recording sheet. The image processing unit 32 comprises a controller 32B, such as a CPU, which reads the image data from the storage device 32A.

Figure 2:
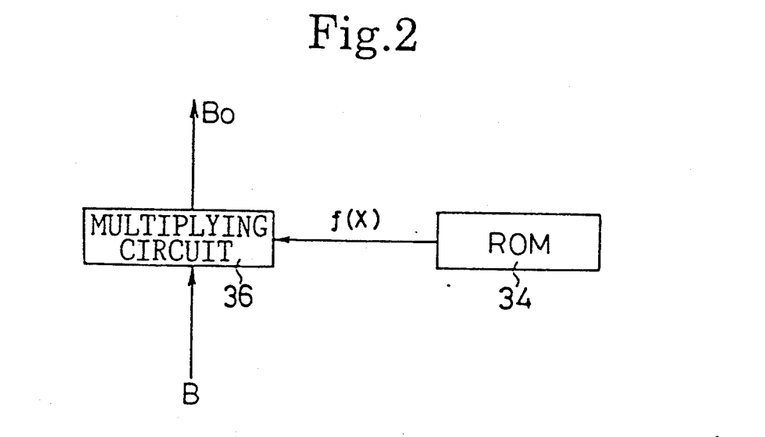
FIG. 2 is a block diagram of a correction circuit incorporated into the scanning exposure device of the first embodiment.

As shown in FIG. 2, the correction circuit 30 comprises a ROM (read-only memory) 34 which functions as a storage means and a multiplying circuit 36 which functions as multiplying means. The ROM 34 stores a table of exposure position data A corresponding to the exposure positions X, namely, positions No. 1 to No. 2376, and corresponding correction coefficients f(X) as shown in FIG. 3A. The correction circuit 30 reads the correction coefficients f(X) respectively corresponding to the exposure position data A corresponding to the exposure positions X. Then the multiplying circuit 36 multiplies the exposure intensity data B corresponding to exposure positions X by the correction coefficients f(X) corresponding to the exposure positions X to obtain working exposure data Bo (=B·f(X)). The intensity Io of the laser beam L controlled on the basis of the driving signal DI provided by the driving circuit 28 is proportional to the working exposure light data Bo; that is, $$Io = k \cdot Bo = k \cdot B \cdot f(X) \qquad (1)$$

where k is a proportional constant.

The laser beam L of the intensity Io is reflected by the mirror 24a of the polygonal rotating mirror 24. The reflectance of the mirror 24a varies with the angle of incidence of the laser beam L on the mirror 24a. The angle of incidence of the laser beam L corresponds to the direction of travel of the reflected laser beam L that falls on the photoconductive drum 20 at the exposure position X. Accordingly, the reflectance varies with the exposure position X, that is, the reflectance is a function of the exposure position X. Thus, the reflectance is represented as a function g(X).

Accordingly, the intensity I of the laser beam L reflected by the polygonal rotating mirror 24 on the photoconductive drum 20 varies with the reflectance g(X). the intensity I of the laser beam L is expressed by:

$$I = g(X) \cdot Io \qquad (2)$$

where Io is the intensity of the laser beam L before reflection of the polygonal rotating mirror 24. Substituting Expression (1) into Expression (2), we obtain $$I = g(X) \cdot k \cdot B \cdot f(X) \qquad (3)$$

The correction coefficient f(X) was determined beforehand by experiments of the inventors to be: F(X) = 1/g(X). The values of the correction coefficients f(X) are stored in a table in the ROM 34.

Therefore, $I = k \cdot B$. Thus, the laser beam of an intensity proportional to the exposure intensity data B of the image to be formed is used to determine exposure regardless in the variation of the reflectance g(X) due to the rotation of the polygonal rotating mirror 24.

A sensor S disposed near the photoconductive drum 20 detects the angular position of the photoconductive drum 20 and the sensor S is electrically connected to the image processing unit 32. The detection signal of the sensor S is given to the image processing unit 32. The image processing unit 32 controls the driving circuit 28 on the basis of the detection signal of the sensor S to drive the polygonal rotating mirror 24 by the driving signal DI in synchronism with the rotation of the photoconductive drum 20.

The exposure position X corresponds to the angular position of the polygonal rotating mirror 24, i.e., the angular position of the working mirror 24a. The correction circuit 30 corrects the exposure intensity data B for the exposure position X and corrects the intensity Io of the laser beam L according to the angular position of the mirror 24a.

The scanning exposure device in this embodiment corrects the exposure light data B according to the angular position of the polygonal rotating mirror 24 corresponding to the exposure position X, and controls the intensity I of the laser beam L reflected by the polygonal rotating mirror 24 so as to be proportional to the exposure intensity data B regardless of the variation of the reflectance g(X) according to the angular position of the polygonal rotating mirror 24. Accordingly, the incorrect exposure due to the variation in the reflectance of the polygonal rotating mirror 24 at any point along the scanning line of the photoconductive drum 20 is prevented.

In a modification, a galvanomirror may be employed instead of the polygonal rotating mirror 24 for deflecting the laser beam. The galvanomirror is turned alternately in opposite directions about a axis parallel to its axis O.

Alternatively, the intensity of the laser beam L emitted by the laser light source 22 may be corrected by a filter unit having a controllable light transmittance. The intensity of the laser beam L reflected by the polygonal rotating mirror 24 may be corrected by disposing a filter having light transmittance continuously varying with position between the photoconductive drum 20 and the polygonal rotating mirror 24 instead of correcting the exposure light data B on the basis of the exposure position X and controlling the intensity Io of the laser beam L according to the corrected exposure light data Bo.

Although the scanning exposure device in the first embodiment according to the present invention has been described as applied to an electrophotographic apparatus, the present invention is applicable also to a scanning exposure device, such as disclosed in U.S. Pat. No. 4,905,037, which scans for exposure a photosensitive and pressure sensitive sheet coated with photosensitive and pressure sensitive capsules.

A scanning exposure device in a second embodiment according to the present invention will be described hereinafter with reference to FIGS. 4 and 5.

Figure 4:
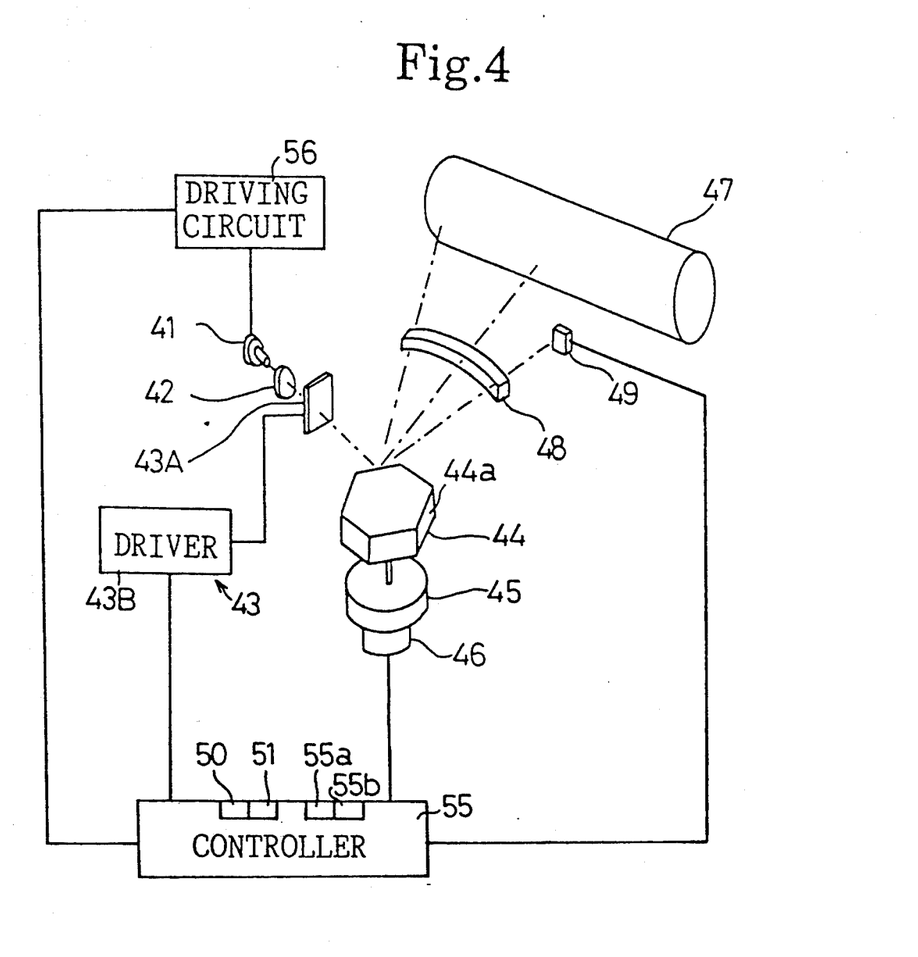
FIG. 4 is a schematic perspective view of a scanning exposure device of a second embodiment of the invention.
Figure 5A:
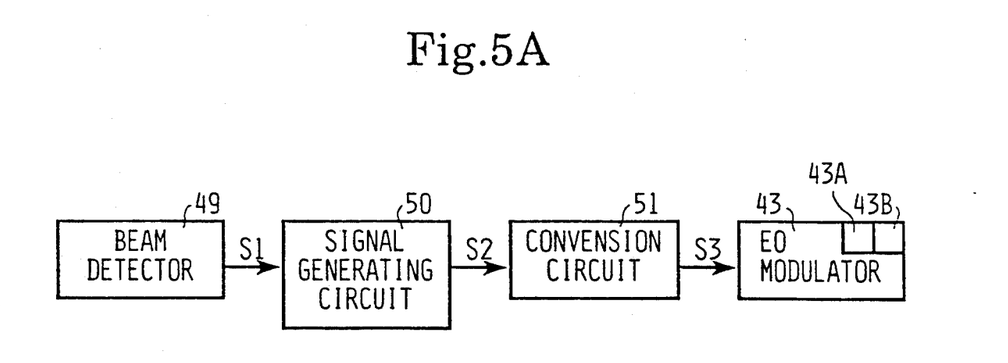
FIG. 5A is a block diagram of an essential portion of the scanning exposure device of the second embodiment.
Figure 5B:
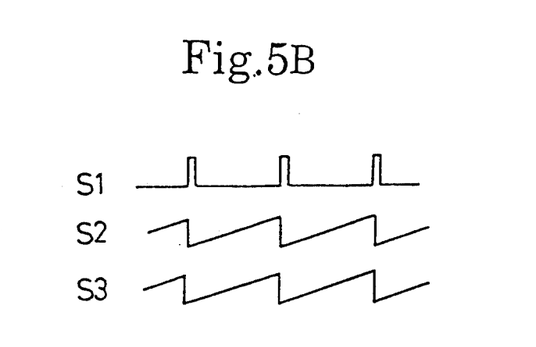
FIG. 5B is a diagram of signals provided by a control circuit incorporated into the scanning exposure device in the second embodiment.

In FIG. 4, there are shown a semiconductor laser 41, a collimator lens 42 optically aligned with the semiconductor laser 41, a part of an EO modulator 43 optically aligned with the collimator lens 42, and a polygonal rotating mirror 44. A laser beam L emitted by the semiconductor laser 41 travels through the collimator lens 42 and the part of the EO modulator 43, which is formed of an electrooptic transparent ceramic (PLZT) 43A, to the polygonal rotating mirror 44. The laser 41 is electrically connected to a driving circuit 56, which functions as a driving means, for driving the laser 41.

The driving circuit 56 is electrically connected to a controller 55 for controlling the scanning exposure device. The controller 55 comprises a storage device 55A, such as a RAM or a floppy disk, which stores image data including exposure position data, representing exposure positions on an image, and the corresponding exposure intensity data. The storage device 55A is capable of storing, at least, an amount of image data corresponding to an entire, recording sheet. The controller 55 comprises CPU 55B, which reads the image data from the storage device 55A.

The EO modulator 43, which functions as the correcting means, comprises an electrooptic modulator in which light transmittance is changed by an applied electric field, such as an electrooptic transparent ceramic (PLZT) 43A, and a driver 43B for driving the electrooptic modulator. The polygonal rotating mirror 44 is driven for rotation by a motor 45 which functions as scanning exposure means. A generator 46 connected to the motor 45 generates an electric signal of a frequency corresponding to the rotating speed of the rotating axis of the motor 45 and outputs the signal to the controller 55. The control circuit 55 controls the motor 45 on the basis of the output signal of the generator 46 so that the polygonal rotating mirror 44 is rotated at a fixed rotating speed. A fθ lens 48 is disposed between the polygonal rotating mirror 44 and a photoconductive drum 47 which functions as photoconductive means. A beam detector 49 is disposed near a starting position where a laser beam L starts scanning along the photoconductive drum 47 to provide a reference timing signal S1 (FIG. 5B).

The controller 55 further comprises a signal generating circuit 50 and a conversion circuit 51. The reference timing signal S1 output at the detector 49 is applied to the signal generating circuit 50. The signal generating circuit 50 is triggered by the pulses of the reference timing signal S1 to generate a sawtooth pulse signal S2. The voltage of each sawtooth pulse of the sawtooth pulse signal S2 increases gradually according to the deflection of the laser beam L deflected by the polygonal rotating mirror 44.

The sawtooth pulse signal S2 is applied to the conversion circuit 51 for controlling the EO modulator 43. Then, the conversion circuit 51 generates a sawtooth pulse signal S3 synchronous with the sawtooth pulse signal S2 as shown in FIG. 5B. The sawtooth pulse signal S3 is used for driving the EO modulator 43. Upon reception of the sawtooth pulse signal S3, the driver 43B drives the electrooptic transparent ceramic (PLZT) 43A to vary continuously the intensity of the laser beam L transmitted through the electrooptic transparent ceramic (PLZT) 43A so that the intensity of the reflected laser beam L on the photoconductive drum 47 does not vary with the variation in the reflectance of the polygonal rotating mirror 44, even if the variation of the reflectance in the polygonal rotating mirror 44 varies with the angle of incidence of the laser beam L on the polygonal rotating mirror 44.

The magnitude of the transmittance of the electrooptic transparent ceramic (PLZT) 43A to cancel out the variation in the reflectance of the polygonal rotating mirror 44 is dependent on the angle of incidence of the laser beam L on the polygonal rotating mirror 44 and the sawtooth pulse signal S3 for determining the magnitude of the transmittance of the electrooptics transparent ceramic (PLZT) 43A is determined experimentally. Accordingly, the conversion circuit 51 for outputting the sawtooth pulse signal S3 is designed based upon experimentally determined data.

The operation of the scanning device in the second embodiment will now be described.

The laser driving circuit 56 drives the semiconductor laser 41 to emit a laser beam L. The laser beam L, collimated by the collimator lens 42, travels through the electrooptic transparent ceramic (PLZT) 43A and falls on the mirror 44a of the polygonal rotating mirror 44. The polygonal rotating mirror 44 is rotated at a high rotating speed by the motor 45 to deflect the laser beam L for scanning. The deflected laser beam L is transmitted through the fθ lens 48 to scan the surface of the photoconductive drum 47.

The beam detector 49 provides the signal S1 upon the detection of the reflected laser beam L reflected by each mirror 44a of the polygonal rotating mirror 44. The signal generating circuit 50 is triggered by each pulse of the signal S1 to generate the sawtooth signal S2. Since the polygonal rotating mirror 44 is rotating at a fixed rotating speed, the sawtooth signal S2 represents the angle of incidence of the laser beam L falling on the mirror 44a of the polygonal rotating mirror 44. The conversion circuit 51 converts the sawtooth signal S2 into the signal S3 for driving the EO modulator 43.

The driver 43B of the EO modulator 43 varies continuously the intensity of the transmitted laser beam L according to the continuously varying input signal. Therefore, the variation in the reflectance of the polygonal rotating mirror 44 can be canceled by the variation in the transmittance of the EO modulator 43. Thus, the intensity of the reflected laser beam L is corrected by regulating the intensity of the laser beam L falling on the polygonal rotating mirror 44.

The scanning exposure device in the second embodiment detects the angle of incidence of the laser beam L on the polygonal rotating mirror 44 from the detection signal of the beam detector 49. Alternatively, the angle of incidence may be detected by using a signal provided by an encoder associated with the motor 45.

A third embodiment of the scanning exposure device of the invention will be described with reference to FIGS. 6 and 7.

Figure 6:
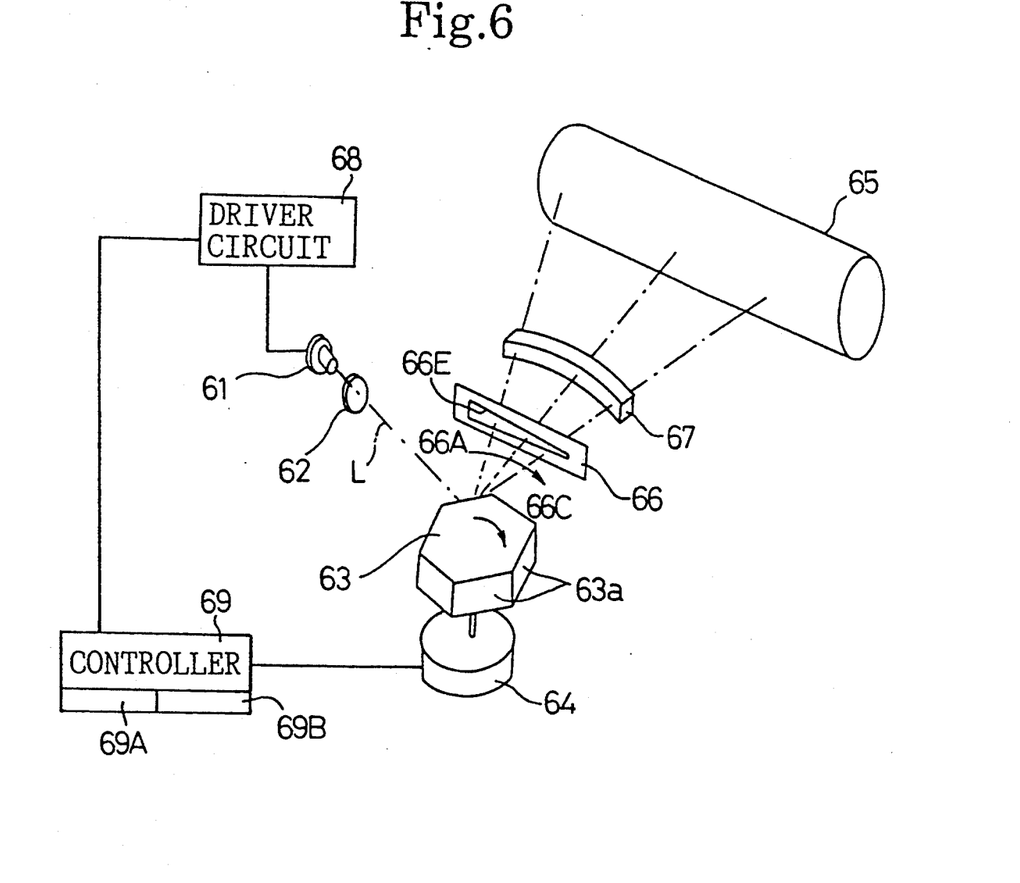
FIG. 6 is a schematic perspective view of a scanning exposure device of a third embodiment of the invention.

Referring to FIG. 6, a semiconductor laser 61, which functions as laser means, is electrically connected to a driver circuit 68, which functions as driving means, for driving the laser 61. A collimator lens 62 is disposed with its optical axis in alignment with that of the semiconductor laser 61. A laser beam L emitted by the semiconductor laser 61 is collimated by the collimator lens 62 and falls on a polygonal rotating mirror 63. The polygonal rotating mirror 63 is rotated by a motor 64 which functions as a scanning exposure means.

The driving circuit 68 is electrically connected to a controller 69 for controlling the scanning exposure device. The controller 69 comprises a storage device 69A, such as a RAM or a floppy disk, which stores image data including exposure position data representing exposure positions of an image and the corresponding exposure intensity data. The storage device 69A is capable of storing at least an amount of image data corresponding to an entire recording sheet. The controller 69 comprises CPU 69B which reads the image data from the storage device 69A.

The polygonal rotating mirror 63 reflects the laser beam L so that the laser beam L is swept along the surface of the photoconductive drum 65. A fθ lens 67 is disposed between a photoconductive drum 65 and the polygonal rotating mirror 63.

A correcting slit unit 66, which functions as correcting means, for correcting the intensity of a reflected laser beam L, is disposed between the fθ lens 67 and the polygonal rotating mirror 63. The correcting slit unit 66 is provided with a tapered slit 66E. The polygonal rotating mirror 63 reflects the laser beam L so that the laser beam L passes a narrower portion of the tapered slit 66E when the incident angle of the laser beam L thereon is larger and so that the laser beam L passes a wider portion of the tapered slit 66E when the incident angle of the laser beam L thereon is small.

In operation, the semiconductor laser 61 is driven by a laser driving circuit 68 to emit the laser beam L. The laser beam L is collimated by the collimator lens 62 and falls on the mirror 63a of the polygonal rotating mirror 63. The polygonal rotating mirror 63 is rotated at a high rotating speed by a motor 64 to deflect the laser beam L so that the laser beam L sweeps the tapered slit 66E from a position 66A to a position 66C. The tapered slit 66E allows a portion of the laser beam L to pass therethrough. Then, the laser beam L that has passed through the tapered slit 66E travels through the fθ lens 67 and falls in a spot on the photoconductive drum 65.

The spot of the laser beam L moves axially on the photoconductive drum 65 for scanning exposure.

Figure 7:
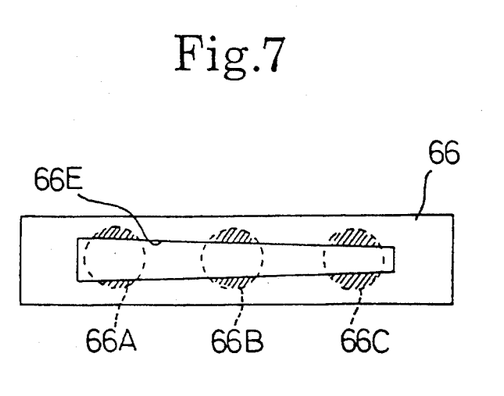
FIG. 7 is an enlarged view of an essential portion of a slit employed in the scanning exposure device in of third embodiment.

As shown in FIG. 7, the tapered slit 66E of the slit unit 66 is tapered from a portion corresponding to the position 66A toward the position 66C. Thus, the intensity of the laser beam L passed by the slit 66E decreases as the laser beam L moves from the position 66A through a position 66B to the position 66C. Thus, the variation in the reflectance of the polygonal rotating mirror 63 according to the variation of the incident angle of the laser beam L on the polygonal rotating mirror 63 is canceled by the variation in the intensity of the laser beam L due to the tapered slit 66E of the slit unit 66.

The correcting slit unit 66 employed by the scanning exposure device in the third embodiment according to the present invention may be substituted by a transmissive filter in which the transmittance varies continuously with position or a fθ lens provided with a correcting mask.

While this invention has been described in connection with specific embodiments thereof, it is evident that many alternative modifications and variations will be apparent to those skilled in the art. Accordingly, the preferred embodiments of the invention as set forth herein are intended to be illustrative and not limitative. Various changes may be made without departing from the spirit and scope of the invention as defined in the following claims.

What is claimed is:

1. A scanning exposure device comprising:
   laser means for emitting a laser beam with a predetermined intensity;
   a mirror for reflecting the laser beam emitted by said laser means;
   a photoconductive means for receiving the laser beam reflected by said mirror;
   a scanning exposure means for scanning the laser beam on said photoconductive means in accordance with a variation of an angular position of said mirror to deflect the laser beam, the laser beam impinging said mirror at an angle of incidence that varies with the angular position of said mirror; and
   a correcting means for correcting the predetermined intensity of the laser beam so that an intensity of the laser beam on said photoconductive means is invariable regardless of a variation in a reflectance of said mirror due to a variation of the angle of incidence.

2. The scanning exposure device as claimed in claim 1, wherein said laser means is connected to a driving means and a driving signal is output from the driving means in order to determine the predetermined intensity of the laser beam emitted by said laser means.

3. The scanning exposure device as claimed in claim 2, wherein said driving means outputs the driving signal which is formed of exposure position data indicating exposure positions on an image to be formed, exposure intensity data indicating intensities of the laser beam corresponding to the exposure positions and correcting coefficients data indicating correcting coefficients corresponding to the exposure positions so that the predetermined intensity of the laser beam varies over a scanning line to produce a uniform intensity on the photoconductive means.

4. The scanning exposure device as claimed in claim 3, wherein said correcting means comprises storage means for storing exposure position data indicating exposure positions on an image to be formed, and correcting coefficients data indicating correcting coefficients corresponding to the exposure positions.

5. The scanning exposure device as claimed in claim 3, wherein said correcting means comprises multiplying means for multiplying exposure intensity data corresponding to exposure positions by correcting coefficients data corresponding to the exposure positions.

6. The scanning exposure device as claimed in claim 1, wherein the variation of reflectance due to the angular position of said mirror is produced by a variation of the angle of incidence of the laser beam onto said mirror.

7. The scanning exposure device as claimed in claim 1, wherein said correcting means includes an electrooptic modulator in which light transmittance is changed by an applied electric field.

8. The scanning exposure device as claimed in claim 1, wherein said correcting means includes a tapered slit of a slit unit.

9. The scanning exposure device of claim 1, wherein said correcting means corrects an intensity of a reflected laser beam reflected from said mirror so that an increase of the intensity of the laser beam on said photoconductive means relative to the intensity of the reflected laser beam is a function of a decrease in the angle of incidence to obtain the laser beam having invariable intensity on said photoconductive means.

10. The scanning exposure device of claim 9, wherein said correcting means comprises a correcting slit unit with a tapered slit formed therein, said tapered slit having a predetermined taper that is a function of the variation in the reflectance of said mirror due to the variation of the angle of incidence.

11. A scanning exposure device comprising:
   a laser means for emitting a laser beam with a predetermined intensity;
   a mirror for reflecting the laser beam emitted by said laser means;
   a photoconductive means for receiving the laser beam reflected by said mirror;
   a scanning exposure means for scanning the laser beam on said photoconductive means by means of said mirror in accordance with a rotation of said mirror to provide a continuous variation of angular position of said mirror thereby producing a continuous variation of an angle of incidence of the laser beam on said mirror and deflections therefrom onto said photoconductive means; and
   a correcting means for correcting the predetermined intensity of the laser beam so that an intensity of the laser beam on said photoconductive means is invariable regardless of a variation of reflectance of said mirror, the variation in reflectance being based on the variation of the angle of incidence of the laser beam on said mirror.

12. The scanning exposure device as claimed in claim 11, wherein said laser means is connected to a driving means and a driving signal is output from the driving means in order to determined the predetermined intensity of the laser beam emitted by said laser means.

13. The scanning exposure device as claimed in claim 12, wherein said driving means outputs the driving signal which is formed of exposure position data indicating exposure positions on an image to be formed, exposure intensity data indicating intensities of the laser beam corresponding to the exposure positions and correcting coefficients data indicating correcting coefficients corresponding to the exposure positions so that the predetermined intensity of the laser beam varies over a scanning line to produce a uniform intensity on the photoconductive means.

14. The scanning exposure device as claimed in claim 13, wherein said correcting means comprises storage means for storing exposure position data indicating exposure positions of an image to be formed, and correcting coefficients data indicating correcting coefficients corresponding to the exposure positions.

15. The scanning exposure device as claimed in claim 13, wherein said correcting means comprises multiplying means for multiplying exposure intensity data corresponding to exposure positions by correcting coefficients data, corresponding to the exposure positions.

16. The scanning exposure device as claimed in claim 11, wherein said correcting means includes an electrooptic modulator in which light transmittance is changed by an applied electric field.

17. The scanning exposure device as claimed in claim 11, wherein said correcting means includes a tapered slit of a slit unit.

18. The scanning exposure device of claim 11, wherein said correcting means corrects an intensity of a reflected laser beam reflected from said mirror so that an increase in the intensity of the laser beam on said photoconductive means relative to the intensity of the reflected laser beam is a function of a decrease in the angle of incidence to obtain the laser beam having invariable intensity on said photoconductive means.

19. The scanning exposure device of claim 18, wherein said correcting means comprises a correcting slit unit with a tapered slit formed therein, said tapered slit having a predetermined taper that is a function of the variation in the reflectance of said mirror due to the variation of the angle of incidence.

* * * * *